TWO-PORT PARAMETERS OF REFLECTORS AND THEIR REALIZATIONS

INVENTOR.
LEON O. CHUA
BY John P. Nesbitt
ATTORNEY

| | | | |
|---|---|---|---|
| FIG. 1C $\begin{bmatrix} v_1 \\ v_2 \end{bmatrix} = \begin{bmatrix} Z \end{bmatrix} \begin{bmatrix} i_1 \\ i_2 \end{bmatrix}$ | $Z = \begin{bmatrix} R\cot 2\theta & -R\csc 2\theta \\ R\csc 2\theta & -R\cot 2\theta \end{bmatrix}$ | $Z(p) = \begin{bmatrix} pL\cot 2\theta & -pL\csc 2\theta \\ pL\csc 2\theta & -pL\cot 2\theta \end{bmatrix}$ | $Z(p) = \begin{bmatrix} -\frac{\cot 2\theta}{pC} & -\frac{\csc 2\theta}{pC} \\ \frac{\csc 2\theta}{pC} & \frac{\cot 2\theta}{pC} \end{bmatrix}$ |
| FIG. 1D $\begin{bmatrix} i_1 \\ i_2 \end{bmatrix} = \begin{bmatrix} Y \end{bmatrix} \begin{bmatrix} v_1 \\ v_2 \end{bmatrix}$ | $Y = \begin{bmatrix} -\frac{\cot 2\theta}{R} & \frac{\csc 2\theta}{R} \\ -\frac{\csc 2\theta}{R} & \frac{\cot 2\theta}{R} \end{bmatrix}$ | $Y(p) = \begin{bmatrix} -\frac{\cot 2\theta}{pL} & \frac{\csc 2\theta}{pL} \\ -\frac{\csc 2\theta}{pL} & \frac{\cot 2\theta}{pL} \end{bmatrix}$ | $Y(p) = \begin{bmatrix} pC\cot 2\theta & pC\csc 2\theta \\ -pC\csc 2\theta & -pC\cot 2\theta \end{bmatrix}$ |
| FIG. 1E $\begin{bmatrix} v_1 \\ i_2 \end{bmatrix} = \begin{bmatrix} H \end{bmatrix} \begin{bmatrix} i_1 \\ v_2 \end{bmatrix}$ | $H = \begin{bmatrix} -R\tan 2\theta & \sec 2\theta \\ \sec 2\theta & -\frac{\tan 2\theta}{R} \end{bmatrix}$ | $H(p) = \begin{bmatrix} -pL\tan 2\theta & \sec 2\theta \\ \sec 2\theta & -\frac{\tan 2\theta}{pL} \end{bmatrix}$ | $H(p) = \begin{bmatrix} \frac{\tan 2\theta}{pC} & -\sec 2\theta \\ -\sec 2\theta & pC\tan 2\theta \end{bmatrix}$ |
| FIG. 1F $\begin{bmatrix} v_1 \\ i_1 \end{bmatrix} = \begin{bmatrix} T \end{bmatrix} \begin{bmatrix} v_2 \\ -i_2 \end{bmatrix}$ | $T = \begin{bmatrix} \cos 2\theta & R\sin 2\theta \\ \frac{\sin 2\theta}{R} & -\cos 2\theta \end{bmatrix}$ | $T(p) = \begin{bmatrix} \cos 2\theta & pL\sin 2\theta \\ \frac{\sin 2\theta}{pL} & -\cos 2\theta \end{bmatrix}$ | $T(p) = \begin{bmatrix} -\cos 2\theta & \frac{\sin 2\theta}{pC} \\ pC\sin 2\theta & \cos 2\theta \end{bmatrix}$ |

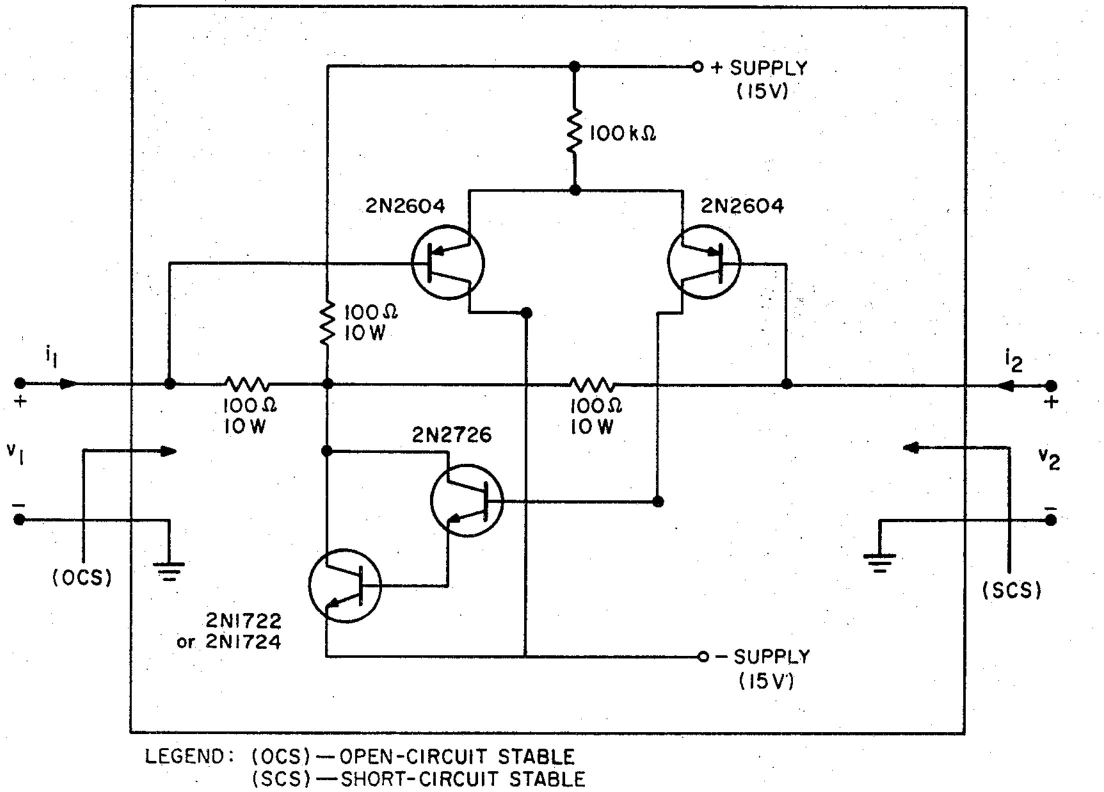

LEGEND: (OCS)—OPEN-CIRCUIT STABLE
(SCS)—SHORT-CIRCUIT STABLE

A PRACTICAL HIGH POWER INIC CIRCUIT

FIG. 4

INVENTOR.
LEON O. CHUA
BY John R. Nesbitt
ATTORNEY (a) REFLECTOR CIRCUIT FOR 0°< θ <90°

(b) REFLECTOR CIRCUIT FOR 90°< θ <180°

PRACTICAL REALIZATION OF A REFLECTOR IN THE MA-VOLT PLANE

INVENTOR.
LEON O. CHUA
BY John R. Nesbitt
ATTORNEY

FIG. 5

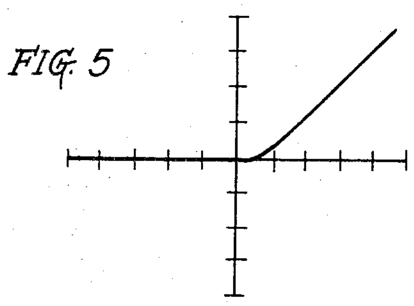

I-V CURVE OF TYPICAL NONLINEAR RESISTOR

FIG. 6

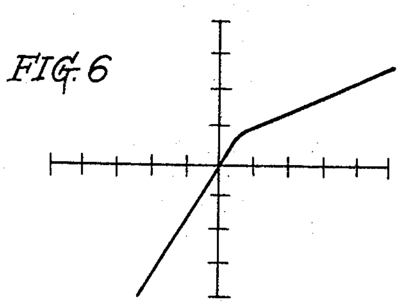

I-V CURVE REFLECTED WITH RESPECT TO THE $\theta = 30°$ LINE

FIG. 7

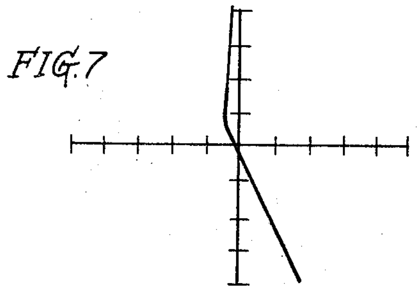

I-V CURVE REFLECTED WITH RESPECT TO THE $\theta = 60°$ LINE

FIG. 8

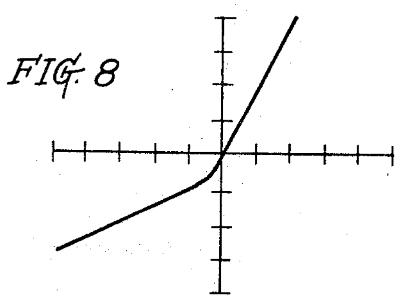

I-V CURVE REFLECTED WITH RESPECT TO THE $\theta = 120°$ LINE

FIG. 9

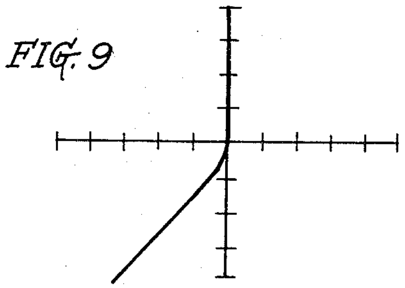

I-V CURVE REFLECTED WITH RESPECT TO THE $\theta = 135°$ LINE

FIG. 10

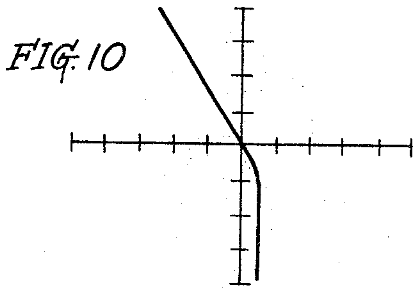

I-V CURVE REFLECTED WITH RESPECT TO THE $\theta = 150°$ LINE

VERTICAL SCALE: I = 1 ma PER DIVISION
HORIZONTAL SCALE: V = 1 VOLT PER DIVISION

SCOPE TRACINGS DEMONSTRATING THE REFLECTION OF THE I-V CURVE OF A NONLINEAR RESISTOR WITH RESPECT TO THE $\theta°$ LINE THROUGH THE ORIGIN.

INVENTOR.
LEON O. CHUA
BY John R. Nesbitt
ATTORNEY

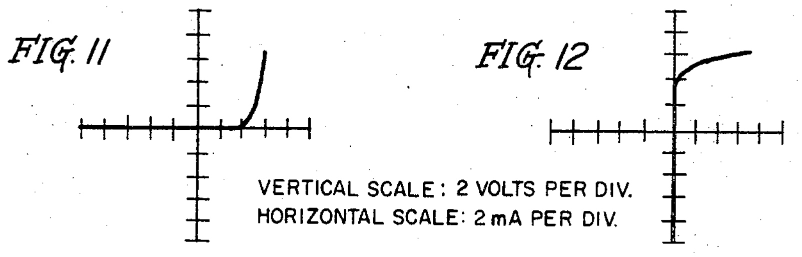
FIG. 11, FIG. 12

(a). A "CONVEX" RESISTOR CAN BE REALIZED BY CONNECTING A "CONCAVE" RESISTOR TO A 45°-R-REFLECTOR (GYRATOR).

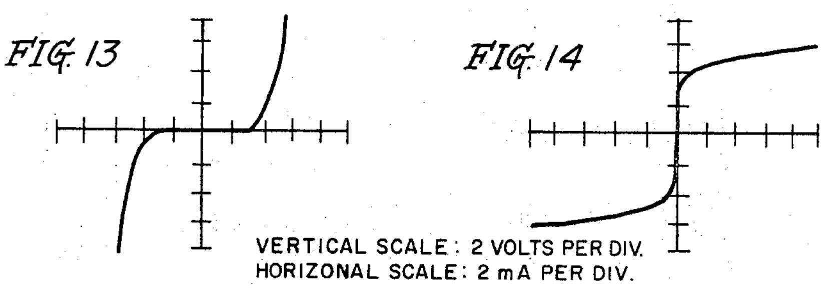
FIG. 13, FIG. 14

(b). SCOPE TRACINGS SHOWING THE REFLECTION OF A TYPICAL I-V CURVE BY A 45°-R-REFLECTOR (GYRATOR).

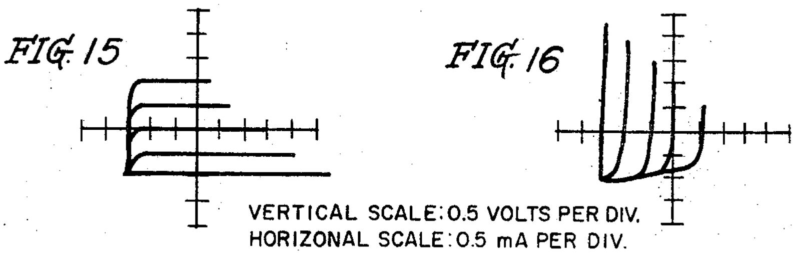
FIG. 15, FIG. 16

(c). THE OUTPUT CHARACTERISTICS OF A CONSTANT CURRENT 3 TERMINAL DEVICE (SUCH AS A TRANSISTOR IN THIS CASE) CAN BE REFLECTED BY A 45°-R-REFLECTOR (GYRATOR) TO OBTAIN A CONSTANT VOLTAGE 3-TERMINAL DEVICE.

SCOPE TRACINGS DEMONSTRATING THE REFLECTION OF AN I-V CURVE OR SETS OF I-V CURVES BY A 45°-R-REFLECTOR (GYRATOR)

INVENTOR.
LEON O. CHUA
BY [signature]
ATTORNEY

3,538,462 LINEAR ACTIVE TWO-PORT NETWORK WHEREIN NONLINEAR IMPEDANCE CHARACTERISTIC AT ONE PORT IS REFLECTED THROUGH PREDETERMINED ANGLE AT SECOND PORT

Leon O. Chua, West Lafayette, Ind., assignor to Purdue Research Foundation

Filed May 27, 1968, Ser. No. 732,127
Int. Cl. H03h 7/00
U.S. Cl. 333—24 12 Claims

ABSTRACT OF THE DISCLOSURE

A linear active 2-port network element for synthesizing nonlinear network components with arbitrarily prescribed characteristics. The elements, by themselves or in combination, can be utilized for a variety of applications, and are particularly useful in integrated circuitry technology. The element included herein is the reflector.

FIELD OF THE INVENTION

This invention relates to an active 2-port network element for realizing nonlinear network components with arbitrarily prescribed characteristics.

DESCRIPTION OF THE PRIOR ART

A basic problem has existed in the electronics field both in nonavailability of devices or components capable of performing a desired function, and in nonavailability of devices or components which are suitable for a desired function or usage. For example, a basic problem has heretofore existed in realizing a nonlinear resistor, inductor, or capacitor with a prescribed Voltage-Current (V–I), Flux-Linkage-Current ($\phi$–I) or Charge-Voltage (Q–V) curve. In addition, in connection with integrated circuits, many problems have arisen, including, for example, the necessity for practical inductorless circuits. These, and other, unsolved problems have made it necessary to seek new "building blocks" to enable the realization of components or devices which will exhibit the desired characteristics and yet be suitable for usage in the contemplated manner.

The widespread application of computers in network analysis and optimization problems and the phenomenal progress in integrated circuit technology over the past few years have removed, as well as introduced, many new circuit constraints which have hitherto been regarded as purely academic. In the case of computer applications, for example, it is now possible to specify a set of desired network functions and let the computer select the optimum values of a set of linear resistors, inductors, and capacitors so that the deviations of the resulting network's performance from the desired specification is minimized. However, in view of the limited capability of such linear elements, the resulting optimum linear network may still be far from satisfactory because the deviations can still be significant. Under this condition, it is necessary to enlarge the class of allowable network elements to include nonlinear resistors, inductors, and capacitors. Since the class of linear elements is a subset of this larger class, it is clear that the optimized network should be at least as good, if not better, than the linear case. In other words, given two networks with the same topology, an optimum choice of nonlinear elements will in general outperform an optimum choice of linear elements. Conversely, given two networks for realizing identical functions (one using nonlinear elements, and the other using only linear elements), the nonlinear version should in general require a smaller number of network elements.

Since the nonlinear elements that exist in their natural form have characteristic curves which are governed by the physical properties of the materials comprising the elements, it is to be expected that the I–V, $\phi$–I, and Q–V curves as required by an optimum network will not be commercially available. Hence, before one can realize an optimum nonlinear network, it is necessary to synthesize a nonlinear resistor, inductor, or capacitor with a prescribed I–V, $\phi$–I, or Q–V curve, using only commercially available components as building blocks. This fundamental problem is often referred to as the nonlinear element realization problem.

Before the advent of integrated circuits, the nonlinear element realiaztion problem was rather academic because it was difficult to combine many discrete components without introducing an excessive amount of parasitics. Moreover, since active elements are usually required, the amount of power dissipation could be prohibitive. Even if these difficulties can be circumvented, the physical size of the synthesized element would be too bulky. These practical considerations can now be overcome by using integrated cricuits. It is no longer unrealisitc to think of a nonlienar element made up of a few dozen resistors, zener diodes and transistors because the finished size of the integrated circuit need not be larger than the present discrete components. Hence, the parallel development of computer optimization techniques and integrated circuit technology has rendered the nonlinear element realization puroblem a rather pressing one.

There are several techniques available for realizing a nonlinear resistor with a prescribed monotonic I–V curve. However, little is known for realizing a nonlinear inductor or a nonlienar capacitor. Unlike in the case of nonlinear resistors, only a few types of nonlinear inductors (iron-core inductors, for example) and nonlinear capacitors (barium-titanate dielectric capacitors, for example) are available as basic building blocks. The difficulty is further aggravated by the fact that most of these elements exhibit some hysteresis characteristics, thus making them virtually useless as building blocks.

SUMMARY OF THE INVENTION

This invention provides a solution to many of the problems now existing in the electronics field through the introduction of linear active 2-port network elements and combinations thereof heretofore unknown. Through the use of these network elements prescribed, nonlinear components can be realized that were heretofore unobtainable.

It is an object of this invention to provide a new 2-port network element for realizing nonlinear components with heretofore unobtainable prescribed characteristics.

It is yet another object of this invention to provide a new 2-port network element for realizing a prescribed resistor, capacitor, or inductor.

It is still another object of this invention to provide a new 2-port network element to be known as a reflector.

It is yet another object of this invention to provide a reflector for reflecting a curve such that the reflected curve is a reflection of the original curve with respect to a straight line through the origin having an angle $\theta$ with the horizontal axis.

With these and other objects in view which will become apparent to one skilled in the art as the description proceeds, this invention resides in a novel construction combination and arrangements of parts substantially as hereinafter described and more particularly defined by the appended claims, it being understood that such changes in the precise embodiments of the herein disclosed invention may be included as come within the scope of the claims.

FIGS. 1A, B, C, D, E and F constitute a table of 2-port parameters of reflectors and realization thereof.

FIG. 4 is a schematic circuit diagram of a high power INIC circuit used in the reflectors.

FIGS. 5 through 10 are graphical illustrations of I–V curves of a nonlinear resistor reflected with respect to the $\theta°$-line through the origin.

FIGS. 11 and 12 are graphical illustrations demonstrating the reflection of a concave I–V curve into a convex I–V curve by a 45°-reflector.

FIGS. 13 and 14 are graphical illustrations demonstrating the reflection of a typical I–V curve by a 45°-R-reflector.

Figures 1A, 1B:
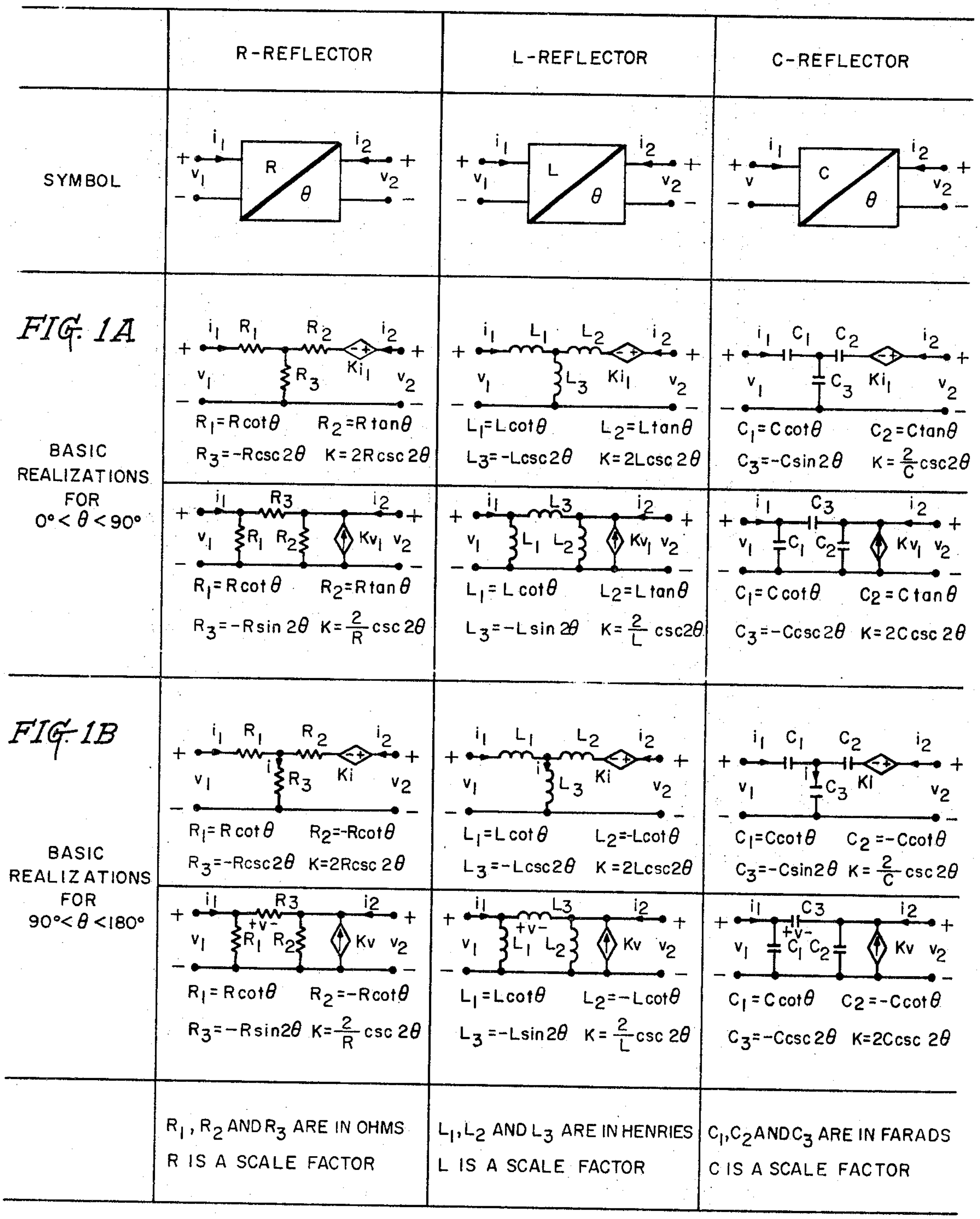

FIGS. 15 and 16 are graphical illustrations showing the reflection of a constant current 3-terminal device (transistor) by a 45°-R-reflector to obtain a constant voltage 3-terminal device.

A 2-port network element for the purpose of reflecting a given I–V, $\phi$–I, or Q–V curve with respect to a prescribed straight line (through the origin) having an angle $\theta$ with the horizontal axis will hereinafter be described and referred to as a reflector.

Since there are three types of curves to be reflected, a reflector can be classified as an R-, L-, or C-reflector. Since the development of the three types of reflectors follows along similar lines, discussion will be directed primarily only to the R-reflector.

By a straightforward geometrical analysis, it can be easily verified that in order to reflect a point $P_2(-I_2, V_2)$ about a $\theta°$-straight line through the origin, the corresponding coordinates of $P_1(I_1, V_1)$ must be given by:

$$V_1 = (\cos 2\theta) V_2 - (\sin 2\theta) I_2 \quad \text{(R1)}$$

$$I_1 = (\sin 2\theta) V_2 + (\cos 2\theta) I_2 \quad \text{(R2)}$$

Equations R1 and R2 can be described by the transmission matrix $$T = \begin{bmatrix} \cos 2\theta & \sin 2\theta \\ \sin 2\theta & -\cos 2\theta \end{bmatrix} \quad \text{(R3)}$$

From this matrix, the remaining sets of equivalent 2-port parameters can be derived, and are set forth in FIG. 1, and, more particularly, in FIGS. 1C, D, E, and F for all three types of reflectors. The constants R, L, and C have been introduced as scale factors.

A reflector is a nonreciprocal linear 2-port network element. This property is obvious from an inspection of the Z or Y matrix, as shown in FIG. 1.

Two reflectors connected in cascade do not result in a new reflector. In fact, if a $\theta_1°$-reflector is connected in cascade with a $\theta_2°$-reflector (with port 2 of the former connected to port 1 of the latter), the resulting 2-port network becomes a rotator with an angle of rotation $\theta$ given by $$\theta = 2(\theta_1 - \theta_2) \quad \text{(R4)}$$

This property can be easily proved by multiplying the two transmission matrices corresponding to $\theta_1°$ and $\theta_2°$, respectively. From Equation R4, it follows that the cascade operation is in general not commutative. In fact, the only case where the cascade operation does commute is when $\theta_1$ and $\theta_2$ differ by a multiple of 90°, in which case, Equation R4 reduces to $$\theta = 2\theta_2 \pm (n)(90°) - \theta_2 = \pm n(180°) \quad \text{(R5)}$$

Equation R4 implies that two identical reflectors in cascade results in the identity transformation. This property is, of course, obvious geometrically because two reflections about the same straight line is equivalent to no reflection at all.

The cascade connection between a $\theta_1°$-reflector and a $\theta_2°$-rotator results in a $\theta°$-reflector, where $$\theta = (\theta_1 \mp \theta_2)/2 \quad \text{(R6)}$$

The minus (plus) sign is used if the reflector is on the left (right) of the rotator. In view of this property, a $(\theta + 90°)$-reflector can be realized by cascading a $\theta°$-reflector with a 180°-rotator;

A negative-impedance-inverter (NIV) can be realized by cascading a $\theta_1°$-R-reflector with a $\theta_2°$-R-reflector such that $(\theta_1 - \theta_2) = 45°$, which has some definite advantages over a single 90° rotator; and The reflector is an active 2-port network for all values of $\theta$ except $\theta = 45°$ and $\theta = 135°$.

Since a reflector is nonreciprocal, at least one controlled source with a constant of proportionality K is required for its realization. The value $k$ is separately defined for R, L, and C reflectors as indicated in FIGS. 1A and 1B.

Figure 2:
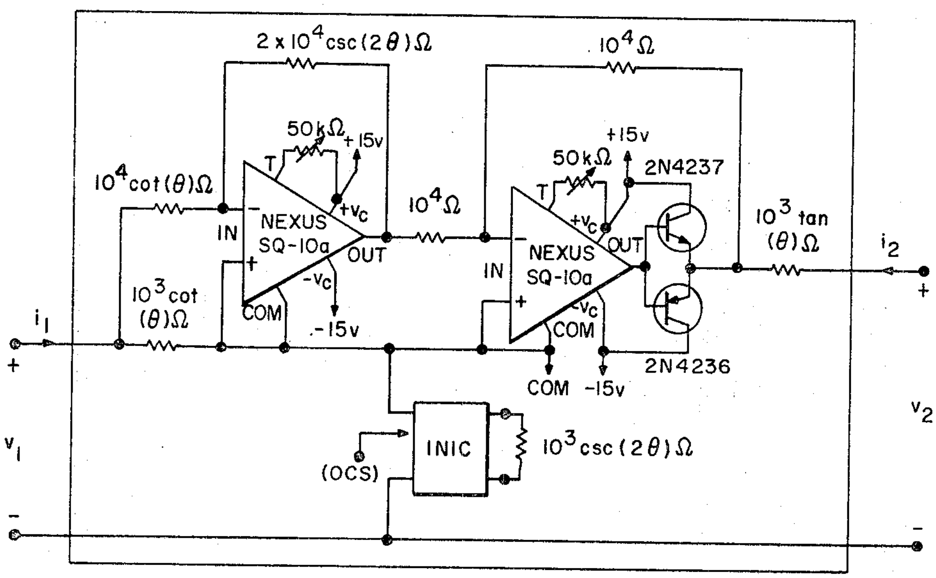
FIG. 2 is a schematic diagram of a reflector circuit for $0° < \theta < 90°$.
Figure 3:
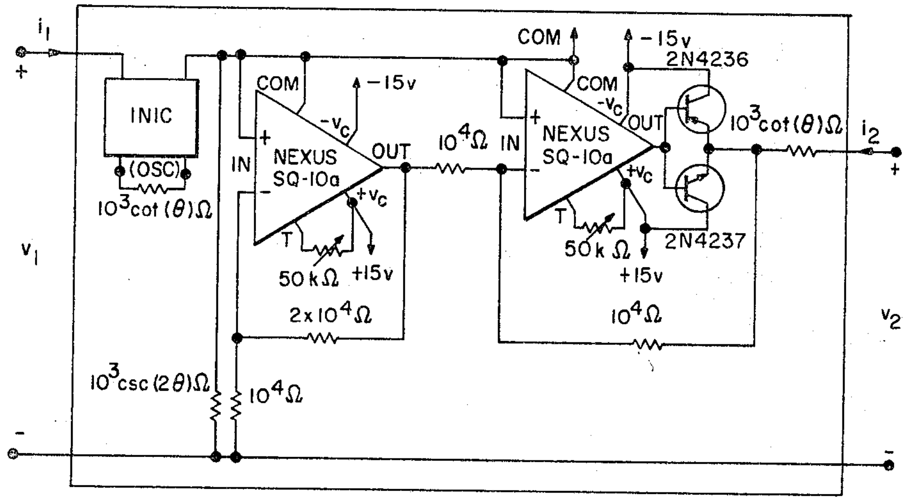
FIG. 3 is a schematic diagram of a reflector circuit for $90° < \theta < 180°$.

Several "minimal" realizations are given in FIGS. 1A and B, minimal meaning the network has the least possible number of negative elements and controlled sources. Observe that if the realization corresponding to the range of angles shown in FIG. 1 is chosen, then only one negative element and one controlled source are required to realize a reflector with an arbitrary angle. Several reflector circuits have been designed and built, and two practical realizations are shown in FIGS. 2 and 3, with the current inversion negative impedance converter (commonly abbreviated as INIC) circuit shown in FIGS. 2 and 3 in block form being shown in schematic form in FIG. 4. An INIC circuit is standard terminology in the art and a mathematical explanation of operation can be found, for example, in "Active Network Synthesis," by K. Su, McGraw-Hill Book Company. The triangular boxes shown in FIGS. 2 and 3, represent operational amplifiers manufactured by the Fairchild Nexus Company of Massachusetts, commonly denoted Nexus-SQ–10a. Each operational amplifier shown in FIG. 2 and in FIG. 3, is connected in the standard voltage-gain configuration such that the voltage measured from the terminal label "OUT" with respect to the terminal labeled "COM" is equal to a constant equal to the ratio between the "feedback resistor" and the "input resistor," each having one terminal connected to the "negative" input terminal of the operational amplifier, times the negative of the voltage measured from the other terminal of the input resistor with respect to the terminal labeled "COM." The two operational amplifier circuits are connected in cascade with one another in order that the double phase inversion will cancel out, thereby simulating a voltage-controlled voltage source with a positive controlling coefficient.

In order to demonstrate the theory of reflectors, several graphs representing scope tracings of the reflected I–V curve of a typical nonlinear resistor are shown in FIGS. 5 through 10. Since the 45°-R-reflector converts any I–V curve into its dual, it is of special importance and several graphs representing scope tracings are shown in FIGS. 11 through 16, which tracings demonstrate the ease in reflecting any monotonic-I–V curves by a 45°-R-reflector.

A reflector is an infinite bandwidth element. However, due to the frequency limitations of the active elements, it is found that the reflector deteriorates in performance as the operating frequency increases.

What is claimed is:

1. A linear active network device, comprising: first, second and third linear resistors and a controlled source, having a constant of proportionality $k$, connected in T-configuration to form a 2-port network, one of which resistors is a negative resistor, wherein said linear resistors are connected to one another, and the controlled source is in series with the second resistor and wherein said first resistor is equal to $R \cot \theta$ ohm, said second resistor is equal to $R \tan \theta$ ohm, and said resistor is equal to $-R \csc 2\theta$ ohm, and the value of $k$ is equal numerically to $2R \csc 2\theta$, whereby a predetermined nonlinear resistor characteristic connected to one port is reflected through the angle $\theta$, as seen at the other port, and $\theta$ is selected, as desired between the values 0° and 90°.

2. A linear active network device, comprising: first, second and third linear resistors and a controlled source, having a constant of proportionality $k$, connected in T-configuration to form a 2 port network, one of which resistors is a negative resistor, wherein said linear resistors are connected to one another, and the controlled source is in series with the second resistor and wherein said first resistor is equal to $R \cot \theta$ ohm, the second resistor is equal to $-R \cot \theta$ ohm, the third resistor is equal to $-R \csc 2\theta$ ohm, and the value of $k$ is equal numerically to $2 R \csc 2\theta$, whereby a predetermined nonlinear resistor characteristic connected to one port is reflected through the angle $\theta$, as seen at the other port, and $\theta$ is selected, as desired, between the values 90° and 180°.

3. A linear active network device, comprising: first, second and third linear resistors and a controlled source, having a constant of proportionality $k$, connected in a pi-configuration to form a 2-port network, one of which resistors is a negative resistor, wherein said linear resistors are connected to one another, and the controlled source is in parallel with the second resistor and wherein said first resistor is equal to $R \cot \theta$ ohm, the second resistor is equal to $R \tan \theta$ ohm, the third resistor is equal to $-R \sin 2\theta$ ohm, and the value of $k$ is equal numerically to $2/R \csc 2\theta$, whereby a predetermined nonlinear resistor characteristic connected to one port is reflected through the angle $\theta$, as seen at the other port, and $\theta$ is selected, as desired, between the values 0° and 90°.

4. A linear active network device, comprising: first, second and third linear resistors and a controlled source, having a constant of proportionality $k$, connected in a pi-configuration to form a 2-port network, one of which resistors is a negative resistor, wherein said linear resistors are connected to one another, and the controlled source is in parallel with the second resistor and wherein said first resistor is equal to $R \cot \theta$ ohm, the second resistor is equal to $-R \cot \theta$ ohm, the third resistor is equal to $-R \sin 2\theta$ ohm, and the value of $k$ is equal numerically to $2/R \csc 2\theta$, whereby a predetermined nonlinear resistor characteristic connected to one port is reflected through the angle $\theta$, as seen at the other port, and $\theta$ is selected as desired, between the values 90° and 180°.

5. A linear active network device, comprising: first, second and third linear inductors and a controlled source, having a constant of proportionality $k$, connected in a T-configuration to form a 2-port network, one of which inductors is a negative inductor, wherein said linear inductors are connected to one another, and the controlled source is in series with the second inductor and wherein said first inductor is equal to $L \cot \theta$ henry, the second inductor is equal to $L \tan \theta$ henry, the third inductor is equal to $-L \csc 2\theta$ henry, and the value of $k$ is equal numerically to $2L \csc 2\theta$, whereby a predetermined nonlinear inductor characteristics connected to one port is reflected through the angle $\theta$, as seen at the other port, and $\theta$ is selected as desired, between the values 0° and 90°.

6. A linear active network device, comprising: first, second and third linear inductors and a controlled source, having a constant of proportionality $k$, connected in a T-configuration to form a 2-port network, one of which inductors is a negative inductor, wherein said linear inductors are connected to one another, and the controlled source is in series with the second inductor and wherein said first inductor is equal to $L \cot \theta$ henry, the second inductor is equal to $-L \cot \theta$ henry, the third inductor is equal to $-L \csc 2\theta$ henry, and the value of $k$ is equal numerically to $2L \csc 2\theta$, whereby a predetermined nonlinear inductor characteristic connected to one port is reflected through the angle $\theta$, as seen at the other port, and $\theta$ is selected as desired, between the values of 90° and 180°.

7. A linear active network device, comprising: first, second and third linear inductors and a controlled source, having a constant of proportionality $k$, connected in pi-configuration to form a 2-port network, one of which inductors is a negative inductor, wherein said linear inductors are connected to one another, and the controlled source is in parallel with the second inductor and wherein said first inductor is equal to $L \cot \theta$ henry, the second inductor is equal to $L \tan \theta$ henry, the third inductor is equal to $-L \sin 2\theta$ henry, and the value of $k$ is equal numerically to $2/L \csc 2\theta$, whereby a predetermined nonlinear inductor characteristic connected to one port is reflected through the angle $\theta$, as seen at the other port, and $\theta$ is selected as desired, between the values of 0° and 90°.

8. A linear active network device, comprising: first, second and third linear inductors and a controlled source, having a constant proportionality $k$, connected in a pi-configuration to form a 2-port network, one of which inductors is a negative inductor, wherein said linear inductors are connected to one another, and the controlled source is in parallel with the second inductor and wherein said first inductor is equal to $L \cot \theta$ henry, the second inductor is equal to $-L \cot \theta$ henry, the third inductor is equal to $-L \sin 2\theta$ henry, and the value of $k$ is equal numerally to $2/L \csc 2\theta$, whereby a predetermined nonlinear inductor characteristic connected to one port is reflected through the angle $\theta$, as seen at the other port, and $\theta$ is selected as desired between the values 90° and 180°.

9. A linear active network device, comprising: first, second and third linear capacitors and a controlled source, having a constant of proportionality $k$, connected in T-configuration to form a 2-port network, one of which capacitors is a negative capacitor, wherein said linear capacitors are connected to one another, and the controlled source is in series with the second capacitor and wherein said first capacitor is equal to $C \cot \theta$ farad, the second capacitor is equal to $C \tan \theta$ farad, the third capacitor is equal to $-C \sin 2\theta$ farad, and the value of $k$ is equal numerically to $2/C \csc 2\theta$, whereby a predetermined nonlinear capacitor characteristic connected to one port is reflected through the angle $\theta$, as seen at the other port, and $\theta$ is selected as desired between the values 0° and 90°.

10. A linear active network device, comprising: first, second and third linear capacitors and a controlled source, having a constant of proportionality $k$, connected in T-configuration to form a 2-port network, one of which capacitors is a negative capacitor, wherein said linear capacitors are connected to one another, and the controlled source is in series with the second capacitor and wherein said first capacitor is equal to $C \cot \theta$ farad, the second capacitor is equal to $-C \cot \theta$ farad the third capacitor is equal to $-C \sin 2\theta$ farad, and the value of $k$ is equal numerically to $2/C \csc 2\theta$, whereby a predetermined nonlinear capacitor characteristic connected to one port is reflected through the angle $\theta$, as seen at the other port, and $\theta$ is selected as desired between the values 90° and 180°.

11. A linear active network device, comprising: first, second and third linear capacitors and a controlled source, having a constant of proportionality $k$, connected in pi-configuration to form a 2-port network, one of which capacitors is a negative capacitor, wherein said linear capacitors are connected to one another, and the controlled source is in parallel with the second capacitor, and wherein said first capacitor is equal to $C \cot \theta$ farad, the second capacitor is equal to $C \tan \theta$ farad, the third capacitor is equal to $-C \csc 2\theta$ farad, and the value of $k$ is equal numerically to $2 C \csc 2\theta$, whereby a predetermined nonlinear capacitor characteristic connected to one port is reflected through the angle $\theta$, as seen at the other port, and $\theta$ is selected as desired between the values 0° and 90°.

12. A linear active network device, comprising: first, second and third linear capacitors and a controlled source, having a constant of proportionality $k$, connected in pi-configuration to form a 2-port network, one of which capacitors is a negative capacitor, wherein said linear capacitors are connected to one another, and the controlled source is in parallel with the second capacitor, and wherein said first capacitor is equal to $C \cot \theta$ farad, the second capacitor is equal to $-C \cot \theta$ farad, the third capacitor is equal to $-C \csc 2\theta$ farad, and the value of $k$ is equal numerically to $2C \csc 2\theta$, whereby a predetermined nonlinear capacitor characteristic connected to one port is reflected through the angle $\theta$, as seen at the other port, and $\theta$ is selected as desired between the values 90° and 180°.

References Cited

UNITED STATES PATENTS 3,109,147 10/1963 Witt ............ 333—24 X

PAUL L. GENSLER, Primary Examiner

U.S. Cl. X.R.

333—80